Aug. 4, 1964          E. A. HENNINGSEN ET AL          3,143,353
                    CONTROL MECHANISM FOR SPREADER
Original Filed Feb. 27, 1961                          2 Sheets-Sheet 2

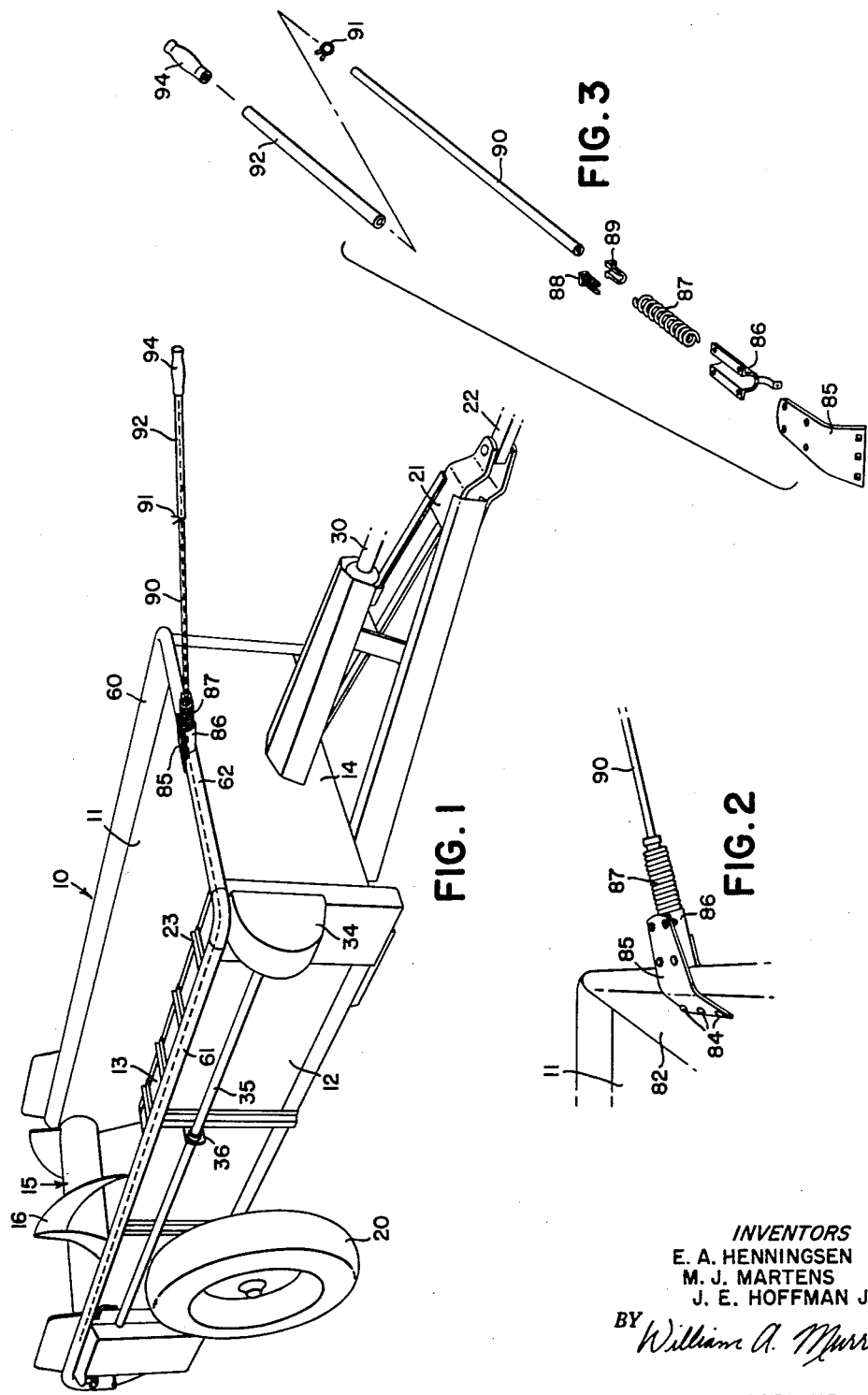

INVENTORS
E. A. HENNINGSEN
M. J. MARTENS
J. E. HOFFMAN JR.
BY *William A. Murray*

ATTORNEY

United States Patent Office 3,143,353
Patented Aug. 4, 1964

3,143,353
CONTROL MECHANISM FOR SPREADER
Etlar A. Henningsen, Geneseo, Maurice J. Martens, East Moline, and John E. Hoffman, Jr., Moline, Ill., assignors to Deere & Company, Moline, Ill., a corporation of Delaware
Continuation of application Ser. No. 91,690, Feb. 27, 1961. This application Oct. 21, 1963, Ser. No. 318,151
10 Claims. (Cl. 275—3)

This invention relates to a control mechanism and more particularly to a control mechanism used on a farm implement adapted to be drawn by a tractor. Still more particularly this invention relates to the control elements which extend from drive mechanism on the trailing implement to a point adjacent the operator's station on the tractor.

This is a continuation of application Ser. No. 91,690, filed February 27, 1961, now abandoned.

It is one of the main objects of the present invention to provide a control mechanism utilizing a flexible cable extending around the outer surface of a material container and adapted for connection to adjustable drive mechanism on the material container. The container has upright side walls formed at their upper edges into rolls or tubes through which a cable may be threaded. One end of the cable is connected to the drive mechanism and the opposite end extends around the forward end of the container and is connected to a control element extending in the direction of the operator's station.

It is a further object of the present invention to include therein a control device featuring a pair of hollow telescoping rods, one of which is connected to the opposite end of the aforementioned cable and operates in response to the telescopic movement of the two rods to apply pressure on the cable. Consequently merely by pulling on one of the rods, the drive mechanism for the material unloader may be adjusted.

It is still a further object of the present invention to provide the aforementioned telescoping rods on the forward wall of the container and be connected thereto by articulate means which normally effect a biasing force on the rods to project directly forwardly of the wall, but will yield in all directions to side pressure on the rods. By the particuar type articulate connection herein to be described, the movement of the rod, other than in telescoping manner, will not affect the drive mechanism on the material container.

Other objects and advantages of the present invention will become apparent to those skilled in the art as the nature of the invention is better understood from the following description and as shown in the accompanying drawings.

FIG. 1 is a front and side perspective view of a manure spreader incorporating the features of the present invention.

FIG. 2 is a side perspective view of a forward portion of the container box and a section of the control elements.

FIG. 3 is an exploded view of the telescopic rods and their associated mounting mechanism.

Figure 4:
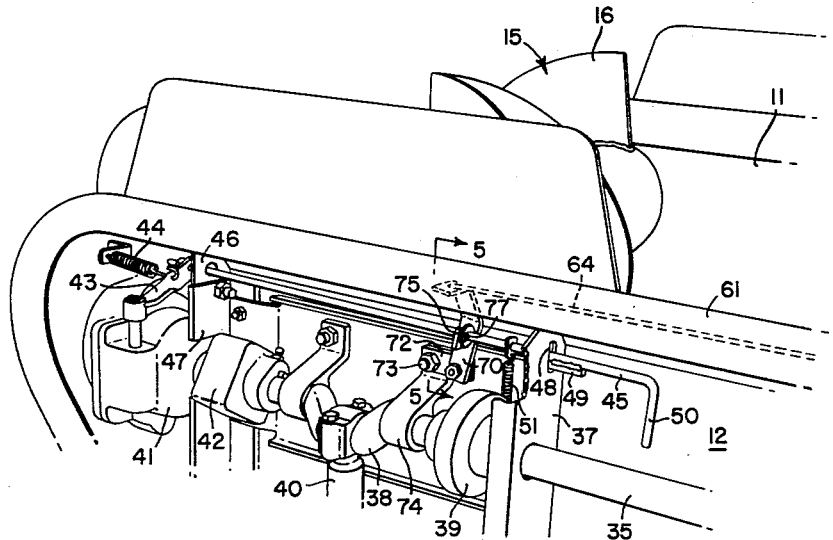
FIG. 4 is a front and side perspective view of the rear end of the manure spreader.

The material handling implement or manure spreader shown in FIG. 1 is of a type shown and described in detail in U.S. Patent 3,014,729 which issued to Messrs. Etlar A. Henningsen and Elvis E. Klouda, December 26, 1961. Details of the spreader may be had by reference to the patent.

Referring now to FIG. 1, there is provided a mobile fore-and-aft extending container or box 10 having oppositely disposed fore-and-aft extending side walls 11, 12 interconnected at their lower edges by a floor 13 and at their front by an upright wall 14. The rear end of the container or box 10 is left open to provide a material discharge or outlet. Disposed across the open rear end is a combination beater-widespread 15 contacting material feeding rearwardly and dispatching the material both laterally and rearwardly of the container 10. Details of the widespread 15 are unimportant but, as is conventional, it has an auger flight means 16 thereon which contacts, beats, and separates material as material comes in contact therewith. The widespread 15 is mounted on a transverse driveshaft, not shown, carried at opposite ends on the respective side walls 11, 12.

The container 10 is supported at its rear by a pair of transversely spaced supporting wheels, one of which is shown at 20, and at its forward end by a rigidly forwardly projecting tongue or connecting structure 21 which may be attached to the drawbar of a tractor clevis type connection shown only partially at 22. Advancing means in the form of a floor conveyor 23 operates to move material from front to rear along the floor of the container 10.

The power for operating the material unloader is received from the power take-off shaft of a tractor through longitudinally extending telescopic driveshaft 30 having a forwardly disposed coupling, not shown, adapted to fit on the power take-off shaft. The rear end of a driveshaft 30 is connected to a transverse drive which extends from a central location relative to the front wall of the container outwardly and upwardly to the upper right end of the container. While not shown, such a drive is indicated in its location by the drive housing 34, and may be a chain and sprocket drive with the sprocket being mounted on a fore-and-aft extending driveshaft 35. The shaft 35 is supported by a journal 36 carried on the side wall 12 and on an upright brace or beam 37 at the rear of the spreader. Just rearwardly of the upright brace 37, the driveshaft 35 is connected to an eccentric shaft or crankshaft 38 through a coupling 39. Carried on the eccentric shaft 38 is a downwardly projecting connecting rod 40 which operates a pawl and ratchet drive, not shown, which in turn operates the floor conveyor 23. The rear end of the eccentric shaft 38 is connected to a bevel gear transmission, indicated in its entirety by the reference numeral 41, by means of a second coupling 42. The bevel gear transmission 41 is connected to and operates the shaft for the transverse beater-widespread 15. Provided in the bevel gear drive transmission 41 is a clutch, not shown, controlled by a lever 43. The lever 43 and its associated clutch is normally biased rearwardly to a drive position by means of the spring 44. In some instances, the spring 44 may be carried inside of the bevel gear housing. In the form shown here, it is carried outwardly of the housing and extends from a bracket on the wall 12 to the lever 43. The entire drive mechanism for the material unloader or spreader is shown and described in detail in the aforementioned Henningson and Klouda patent. Should further detail be desired concerning the drive, such may be had by referring to the patent.

Also connected to the lever 43 is a control rod 45 extending in a fore-and-aft direction and through a bracket 46 fixed to an upright brace 47 on the wall 12 and through a slot 48 in the aforementioned side brace 37. The rod 45 has a depending lug 49 positioned adjacent the slot 48. The forward end 50 of the rod 45 extends at right angles to the main axis of the rod and generally provides a gripping portion of the rod. As the rod 45 is drawn forwardly the lever 43 will disengage the clutch in the bevel gear transmission 41. This will stop operation of the widespread 15. Upon the rod 45 being drawn forwardly sufficiently to disengage the clutch, the lug 49 will be positioned forwardly of the wall 37 and unless raised to pass through the slot 48, the lug 49 will sit forwardly of the brace 37 thereby maintaining the clutch in its disengaged position. A spring, such as at 51 may be connected to the rod 45 to cause the lug 49 to seat downwardly of the lower edge of the slot 48.

The side walls 11, 12 as well as the front wall 14 of the material container have upper rolled or tubular edges 60, 61, and 62 respectively, which, of course, are hollow. A cable 64 is disposed in the right tubular edge 61 and partway across the forward tubular edge 62. A hollow and arcuate corner brace 65 interconnects the tubular rolled edges 61, 62 and the cable 64 passes through the hollow center of the brace 65.

Figure 5:
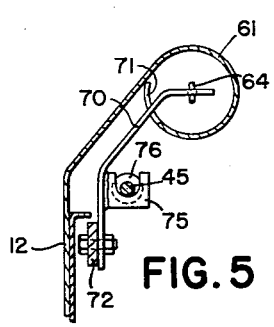
FIG. 5 is a sectional view taken substantially along the line 5—5 of FIG. 4.
Figure 6:
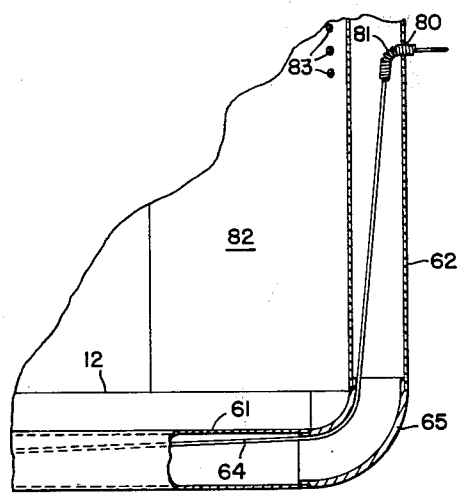
FIG. 6 is a plan view, shown partially in section, of the front right corner of the manure spreader.
Figure 7:
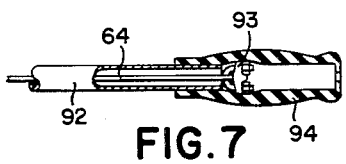
FIG. 7 is a sectional view taken through the extreme forward end of the control mechanism.

The rear end of the cable 64 is connected to a lever 70 disposed just outwardly of the side wall 12. The side wall 12 normally flares inwardly directly beneath the rolled or tubular edge 61. The lever 70 conforms to the flaring angle of the side wall 12 and generally extends into the hollow tubular edge 61, a slot 71 being provided in the edge to permit access of the lever 70. The lever 70 is pivotally mounted on a bracket 72 fixed to the side wall 12 by means of a bolt and nut 73 which is also used to mount a journal block 74 which partially carries the eccentric shaft 38. As may be seen from viewing FIGS. 4 and 5, the lever 70 lies inwardly of the rod 45 and has a transverse bracket portion 75 extending from the face of the lever 70 with a U-shaped opening in its upper edge in which the rod 45 normally sits. A washer 76 is disposed just forwardly of and against the bracket so that the bracket 75 may contact the washer. A cotter pin 77 extends through the rod 45 just forwardly of the washer 76 for purposes of maintaining contact between the lever 70 and the rod 45. By swinging the lever 70 forwardly, the rod 45 will also be drawn forwardly to disengage the clutch contained in the gear housing 41.

The rolled or tubular edge 62 on the forward wall has a central opening 80 therein in which is inserted a guide 81 which in the present specific instance is a coil spring, through which the cable 64 extends. Just rearwardly of the front wall 14 is an inclined panel 82 extending from the floor to the upper edge of the front side 14. Consequently, it may be considered as a false front of the container or box 10. Provided in the panel 82 is a series of bolt openings 83. A forwardly projecting bracket, which angles over the rolled edge 62, has an inclined portion bolted, as at 84, to the panel 82. The bracket 85 has a forwardly projecting portion overlying the opening 80 in the rolled or tubular edge 62. Bolted to the under surface of the forwardly projecting portion of the bracket 85 is a U-shaped fore-and-aft extending clamp member 86. The U-shaped member 86 forms a channel for the forwardly extending portion of the cable 64. Also, a coil spring 87 is clamped between the U-shaped member 86 and the forwardly projecting portion of the bracket 85. The forward end of the spring has a pair of plugs or metallic inserts which fit together to form a tubular insert at the forward end of the spring. The outer surface of the inserts 88, 89 are corrugated so that the coils of the spring 87 will sit in the corrugations. Consequently the spring 87 operates as a clamp for maintaining the inserts 88, 89 in the desired position. Clamped between the inserts 88, 89 is a rear hollow rod or tube 90. The rod 90 extends forwardly and upwardly in the direction of the operator's station and has a spring loaded O-ring 91 mounted on its outer surface which, as will become apparent, operates as a stop for a second hollow tube 92 which slides or telescopes over the outer surface of the first rod 90. As is rather obvious from viewing the drawings, the cable 64 extends through the spring 87 and the telescoping tubes 90, 92 to a forward terminal end having fixed thereon a cable clamp 93 which operates to prevent the end of the cable 64 from extending into the tube 91. Mounted on the clamp 93 and over the forward end of the tubular member 91 is a rubber gripping element 94 of a conventional type.

In operating the control mechanism, it should be recognized that the entire control may be adjusted at the side of the spreader by moving the rod 45 to a desired position to engage or disengage the clutch. However, in normal unloading operation the widespread 15 is rotating. Consequently in normal operation the rod 45 is drawn toward the rear and the clutch is engaged. However, at the end of the spreading operation it is often desired to shut down the beater-widespread for purpose of clearing the last material from the spreader box. This may be done from the operator's station by pulling forwardly on the grip 94 and drawing the telescoping member 92 and the cable 64 forwardly. This will cause the lever 70 to draw the rod 45 forwardly until it reaches a point in which the lug 49 will drop below the lower edge of the slot 48. In this position the clutch is disengaged and is locked in its disengaged position. Also, after discharge it is preferable that the beater-widespread is stopped in order to save wear and general maintenance on the unit. The particular advantage of mounting the telescoping members 90, 92 in the manner shown is to permit the control rods to be flexible or articulate about their rear mounting means on the forward wall 14. For example, should there be something on the tractor which would cause interference upon turning with the control rods 90, 92 the rods will merely yield until the turn is made and the tractor is in fore-and-aft alinement with the spreader at which time the control rods 90, 92 will move in their fore-and-aft disposition.

While only one form of the invention has been shown, it should be recognized that other forms and variations will occur to those skilled in the art. Therefore, while the invention has been shown and described in considerable detail for the purpose of clearly and concisely illustrating the principles of the invention, it is not desired to limit or narrow the invention beyond that which is claimed.

What is claimed is:

1. A control mechanism for a material unloader having front and rear ends and composed of a box-like structure having a floor, upright side and front walls with upper tubular edges, an arcuate shape tubular corner section joining the tubular edges, and a material unloading mechanism with drive means adjacent the rear end, said control mechanism comprising: a throw-out rod connected to the drive means and for effecting drive and no-drive relation between the drive means and the material unloading mechanism; means biasing said rod to effect the drive relation; a throw-out lock between the respective side wall and the rod to lock the rod when in position to effect the no-drive relation; telescoping members including a front member and a rear tubular member; means articulately connecting the members to the upper tubular edge of the front wall for accommodating communication between the rear member and the hollow tubular edge of the upright front wall, said means also including biasing means for effecting normal fore-and-aft and inclined disposition of said members relative to the front wall; a flexible element disposed within the arcuate corner section, within the upper tubular edges of the side and front walls, and within the telescoping rear member; means connecting one end of the flexible element to the throw-out rod; and means connecting the opposite end of the flexible element to the front telescoping member whereby axial movement of the latter member relative to the other member will cause said throw-out rod to effect the no-drive relation.

2. A control mechanism for a material unloader having front and rear ends and composed of a box-like structure having a floor, upright side and front walls with adjoining upper tubular edges, and a material unloading mechanism with adjustable drive means adjacent the rear end of the box-like structure to effect a drive and no-drive relation with the unloading mechanism, said control mechanism comprising: telescoping members including a front member and a rear tubular member; means articulately connecting the members to the upper tubular edge of the front wall for accommodating communication between the rear member and the hollow tubular edge of the upright front wall, said means also including biasing means for effecting normal fore-and-aft and inclined disposition of said members relative to the front wall; a flexible element disposed within the upper tubular edges of the side and front walls and within the rear telescoping member; means connecting one end of the flexible element to the adjustable drive means; and means connecting the opposite end of the flexible element to the front telescoping member whereby axial movement of the latter member relative to the other member will cause said drive means to effect the no-drive relation.

3. A control mechanism for a material unloader having front and rear ends and composed of a box-like structure having a floor, upright side walls extending around the front and sides thereof with a substantial continuous tubular edge extending between the front and rear ends, and a material unloading mechanism with adjustable drive means adjacent the rear end of the box-like structure, said control mechanism comprising: telescoping members including a front member and a rear tubular member projecting forwardly from the box-like structure, means connecting the members to the tubular edge for accommodating communication between the rear tubular member and the tubular edge at the front of the structure; a flexible element disposed within the upper tubular edge and within the rear telescoping member; means connecting one end of the flexible element to the adjustable drive means; and means connecting the opposite end of the flexible element to one of the telescoping members whereby axial movement of the latter member relative to the other member will adjust said drive means.

4. A control mechanism for a material handling implement composed of a material container with upright longitudinal and front side walls having upper tubular edge means, and a material handling mechanism with adjustable drive means adjacent the side walls, said control mechanism comprising: telescoping members including a front member and a rear tubular member; means articulately connecting the members to the front wall for accommodating communication between the tubular member and the tubular edge means, said means also including a biasing means for yieldably resisting deflection of the members from a normal fore-and-aft and inclined disposition; a flexible element disposed within the tubular edge means of the side walls and within the rear telescoping member; means connecting one end of the flexible element to the drive means; and means connecting the opposite end of the flexible element to the front telescoping member whereby movement between the members will adjust the drive means.

5. A control mechanism for a material handling implement composed of a material container with upright longitudinal and front side walls having adjoining upper tubular edges, and a material handling mechanism with adjustable drive means adjacent the side walls, said control mechanism comprising: telescoping members including a front member and a rear tubular member; means supporting the members on the front side wall for accommodating communication between the tubular member and the tubular edge of the front side wall; a flexible element disposed within the upper tubular edges, and within the rear telescoping member; means connecting one end of the flexible element to the drive means; and means connecting the opposite end of the flexible element to the front telescoping member whereby movement between the members will adjust the drive means.

6. A control mechanism for a material unloader having front and rear ends and composed of a box-like structure having a floor, upright wall means extending around the front and sides thereof and a material unloading mechanism with adjustable drive means adjacent the rear end, said control mechanism comprising: substantially continuous tube means having a rear terminal end adjacent the drive means and extending forwardly therefrom outboard of the wall means, said tube means having at its forward end fore-and-aft extending front and rear telescoping members; means articulately connecting the members to the wall means including a biasing device for yieldably resisting deflection of the members from a normal fore-and-aft and inclined disposition relative to the front of the box-like structure; a flexible element disposed within the tube means; means connecting one end of the flexible element to the adjustable drive means; and means connecting the opposite end of the flexible element to one of the telescoping members whereby moving one of the members relative to the other member will effect adjustment of the drive means.

7. A control mechanism for a material unloader having front and rear ends and composed of a box-like structure having a floor, upright wall at the front and sides thereof, and a material unloading mechanism with adjustable drive means adjacent the rear end, said control mechanism comprising: substantially continuous tube means supported on the walls having a rear terminal end adjacent the drive means and extending forwardly therefrom outboard of the walls, said tube means having a fore-and-aft extending tubular member projecting forwardly of the front wall; an adjusting element on the forward end of the tubular member; a flexible element disposed within the tube means; means connecting one end of the flexible element to the adjustable drive means; and means connecting the opposite end of the flexible element to the adjusting element whereby the latter may effect adjustment of the drive means.

8. A control mechanism for a material unloader having front and rear ends and composed of a box-like structure having a floor, upright side and front walls with adjoining upper tubular edges, and a material unloading mechanism with adjustable drive means adjacent the rear end of the box-like structure and adjustable to positions to effect drive and no-drive relation with the unloading mechanism, the drive means further including biasing means effecting adjustment to one of the aforesaid positions, said control mechanism comprising: telescoping members including a front member and a rear tubular member; means articulately connecting the members to the upper tubular edge of the front wall for accommodating communication between the rear member and the hollow tubular edge of the upright front wall, a flexible element disposed within the upper tubular edges of the side and front walls and within the rear telescoping member; means connecting one end of the flexible element to the adjustable drive means; means connecting the opposite end of the flexible element to the front telescoping member whereby telescoping movement of the latter member relative to the other member will cause said drive means to effect the no-drive relation; and limiting means between the telescoping members limiting relative movement of the front member to a position accommodating the adjustment of the drive means to said one of the aforesaid positions.

9. A control mechanism for a material unloader having front and rear ends and composed of a box-like structure having a floor, upright side and front walls with adjoining upper tubular edges, and a material unloading mechanism with adjustable drive means adjacent the rear end of the box-like structure and adjustable to positions to effect drive and no-drive relation with the unloading mechanism, the drive means further including biasing means effecting adjustment to one of the aforesaid positions, said control mechanism comprising: telescoping members including a front member and a rear tubular member; means connecting the members to the upper tubular edge of the front wall for accommodating communication between the rear member and the hollow tubular edge of the upright front wall, a flexible element disposed within the upper tubular edges of the side and front walls and within the rear telescoping member; means connecting one end of the flexible element to the adjustable drive means; means connecting the opposite end of the flexible element to the front telescoping member whereby telescoping movement of the latter member relative to the other member will cause said drive means to effect the no-drive relation; and limiting means between the telescoping members limiting relative movement of the front member to a position accommodating the adjustment of the drive means to said one of the aforesaid positions.

10. A control mechanism for a material unloader having front and rear ends and composed of a box-like structure having a floor, upright side and front walls with adjoining upper tubular edges, and a material unloading mechanism with adjustable drive means adjacent the rear end of the boxlike structure and adjustable to positions to effect drive and no-drive relation with the unloading mechanism, said control mechanism comprising: telescoping members including a front member and a rear tubular member; means connecting the members to the upper tubular edge of the front wall for accommodating communication between the rear member and the hollow tubular edge of the upright front wall, a flexible element disposed within the upper tubular edges of the side and front walls and within the rear telescoping member; means connecting one end of the flexible element to the adjustable drive means; and means connecting the opposite end of the flexible element to the front telescoping member whereby telescoping movement of the latter member relative to the other member will cause said drive means to effect the no-drive relation.

No references cited.